(12) United States Patent
Li et al.

(10) Patent No.: US 6,621,850 B1
(45) Date of Patent: Sep. 16, 2003

(54) BLOCK DETECTION RECEIVER

(75) Inventors: Bin Li, Ottawa (CA); Wen Tong, Ottawa (CA)

(73) Assignee: Nortel Networks Limited, st-laurent (CA)

( * ) Notice: Subject to any disclaimer, the term of this patent is extended or adjusted under 35 U.S.C. 154(b) by 0 days.

(21) Appl. No.: 09/216,972

(22) Filed: Dec. 21, 1998

(51) Int. Cl.[7] .................................................. H04B 1/69
(52) U.S. Cl. ...................... 375/130; 375/142; 375/147; 370/209; 370/320
(58) Field of Search ................................. 375/130, 142, 375/147, 316, 228, 340, 349; 370/320, 335, 342, 441; 455/522

(56) References Cited

U.S. PATENT DOCUMENTS

| | | | |
|---|---|---|---|
| 4,901,307 A | 2/1990 | Gilhousen et al. | 370/320 |
| 5,101,501 A | 3/1992 | Gilhousen et al. | 455/462 |
| 5,103,459 A | 4/1992 | Gilhousen et al. | 370/206 |
| 5,109,390 A | 4/1992 | Gilhousen et al. | 375/335 |
| 5,442,627 A | 8/1995 | Veterbi et al. | 370/209 |
| 5,778,030 A * | 7/1998 | Bruckert et al. | 375/317 |
| 5,790,596 A * | 8/1998 | Sexton | 375/228 |
| 5,930,305 A | 7/1999 | Leib | 375/324 |
| 6,005,626 A | 12/1999 | Ding | 348/608 |
| 6,233,271 B1 * | 5/2001 | Jones et al. | 375/142 |
| 6,249,539 B1 * | 6/2001 | Harms et al. | 375/130 |
| 6,295,311 B1 * | 9/2001 | Sun | 375/147 |

OTHER PUBLICATIONS

Chang, et al., "Comparison of Two Convolutional Orthogonal Coding Techniques for CDMA Radio Communications Systems", IEEE Transactions on Communications, vol. 43, No. 4, Jun. 1995, pp. 2029–2037.

* cited by examiner

*Primary Examiner*—Shuwang Liu

(57) ABSTRACT

A method and apparatus for receiving orthogonal signals in a spread-spectrum communications system. A demodulator provides groups of de-spread samples of a processed received signal. The groups of de-spread samples are passed through an orthogonal code transformer to provide sequential transformer blocks. The blocks are buffered in sequences of 2 or 3. Then each buffered sequence is subjected to a summing, squaring and selection operation a to obtain a desired orthogonal code from each of the transformer blocks of the two or three transformer blocks.

20 Claims, 7 Drawing Sheets

BLOCK DETECTION RECEIVER

FIELD OF THE INVENTION

The present invention relates to spread-spectrum communications systems. More specifically, the present invention relates to a method and apparatus for receiving orthogonal signals in a spread-spectrum communications system.

BACKGROUND OF THE INVENTION

In a typical wireless communication system, a plurality of mobile stations is accommodated. Typically, more than one mobile station utilizes the wireless communications system at any given time. Such a communications system is sometimes called a multiple access communications system.

Radio frequency (RF) signals are used in multiple access communication systems to carry traffic between the mobile stations and base stations. With the enormous and ever increasing popularity of multiple access communications systems (e.g. cellular phone communications systems), the RF spectrum has become a very scarce resource. As a result, it is more and more important for service providers of multiple access communication systems to efficiently use the RF spectrum allocated to them and to maximize the capacity of the multiple access communications systems to carry traffic.

Many different techniques which allow multiple mobile stations to access a multiple access communications system simultaneously have been utilized such as time division multiple access (TDMA), frequency division multiple access (FDMA) and code division multiple access (CDMA). CDMA utilizes spread-spectrum modulation techniques which have certain advantages over TDMA and FDMA. Many new communications systems employed today utilize CDMA. The use of CDMA in a multiple access communications system is disclosed in U.S. Pat. No. 4,901,307 entitled "Spread-Spectrum Multiple Access Communications System Using Satellite or Terrestrial Repeaters" and issued to Qualcomm Incorporated on February 13, 1993. This patent is incorporated by reference herein in its entirety.

A typical multiple access communications system which utilizes CDMA (a "CDMA Communications System") has not only a plurality of mobile stations but also a plurality of base stations with which the mobile stations communicate. In addition, a typical CDMA communications system has at least one forward CDMA channel and at least one reverse CDMA channel. Each forward CDMA channel and each reverse CDMA channel is assigned a unique frequency band, none of which overlap with each other. Typically, there is a guard frequency band between the frequency band(s) used by the forward channel(s) and the frequency band(s) used by the reverse channel(s).

Communications from the base stations to the mobile stations are carried in the forward CDMA channel(s). Each forward CDMA channel is composed of a plurality of code channels. The code channels share the frequency band assigned to the respective forward CDMA channel using spread-spectrum modulation techniques. Each mobile station is associated with a unique code channel. (i.e. communications from the base stations to the mobile stations are carried in the respective code channels).

Similarly, communications from the mobile stations to the base stations are carried in the reverse CDMA channel(s). Each reverse CDMA channel is composed of a plurality of code channels, typically called access channels and reverse traffic channels. The code channels share the frequency band assigned to the respective reverse CDMA channel using spread spectrum modulation techniques. Each mobile station is associated with a unique reverse traffic channel. (i.e. communications from the mobile stations to the base stations are carried in the respective reverse traffic channels). The access channels are typically used to page or notify the base stations of outgoing calls.

In CDMA communications systems defined by ANSI Standard J-STD-008or TIA/EIA Standard IS-95A, which are incorporated by reference herein, each frequency band utilized by the forward CDMA channel(s) and the reverse CDMA channel(s) is 1.23 MHZ wide. In addition, each forward CDMA channel and each reverse CDMA channel is further divided into 64 code channels.

In a CDMA communications system, the base stations may be satellites circulating the globe or stations located on the ground ("terrestrial base stations") or both. At the UHF or higher frequency bands commonly used by CDMA communications systems, a signal from a mobile station commonly arrives at a base station via a plurality of different paths. (i.e. a plurality of signals are commonly received at the base station for each signal sent from the mobile station). Similarly, a signal from a base station directed to a mobile station commonly arrives at the mobile station via a plurality of different paths.

The time it takes (typically called a path delay) for a signal to arrive at its intended destination is commonly different for each path. Moreover, significant phase differences between the signals travelling on different paths may occur especially at the UHF or higher frequency bands. In other words, signals may arrive at a base station from a mobile station (or a mobile station from a base station) from many different directions or paths, each with a different path delay and phase. When signals are received at each base station and each mobile station, destructive summation of the signals may occur with on occasion deep fading. Such multipath fading is common at the UHF or higher frequency bands.

Multipath fading on the signals between the satellites and the mobile stations is not usually as severe as the multipath fading on the signals between the terrestrial base stations and the mobile stations. Since the satellites are normally located in the geosynchronous earth orbit, the distances between mobile stations and any given satellite are relatively the same. In addition, if a mobile station changes location, the distance between the mobile station and a satellite does not change significantly. In contrast, the distances between the mobile stations and the terrestrial base stations can vary quite significantly. One mobile station may be a few hundred feet away from a terrestrial base station and another mobile station may be miles away from the same base station. In addition, if a mobile station changes position, the distance between the mobile station and the terrestrial base station may change significantly. Consequently, the change in the position of the mobile station may change the path delays and phases of all of the signals carried on the respective paths between the mobile station and the terrestrial base station.

In light of the above, signals between the satellites and the mobile stations typically experience fading that is characterized as Rician Fading. In contrast, signals between the terrestrial base stations and the mobile stations typically experience more severe fading that is characterized as Rayleigh Fading. The Rayleigh fading is due, in part, by the signals being reflected from a plurality of objects (e.g. buildings) between the mobile stations and the base stations.

Since a CDMA communications system utilizes a wide band signal in each forward CDMA channel and in each reverse CDMA channel, multipath fading typically only affects a small part of each wide band signal. In other words, CDMA by inherent nature uses a form of frequency diversity to mitigate the deleterious affects of multipath fading.

In addition to frequency diversity, CDMA communications systems commonly use time diversity and space (or path) diversity to mitigate the deleterious affects of multipath fading. Time diversity is commonly employed through the use of repetition, time interleaving and error detection and correction decoding schemes. Space diversity is commonly employed in the reverse CDMA channel(s) through the use simultaneous communication links from each mobile station to a base station employing a plurality of antennas. Each antenna services one of the simultaneous communication links. Space diversity is also commonly employed in the forward CDMA channel(s) and in the reverse CDMA channel(s) by exploiting the unique characteristics of the spread-spectrum signals used by CDMA communications systems.

Many CDMA communications systems, such as CDMA communications systems defined by IS-95A Standard ("IS-95 CDMA Communications Systems"), modulate the traffic carried in each code channel using high speed pseudo noise (PN) modulation techniques at a PN chip rate. Each code channel within a reverse CDMA channel is assigned and modulated with a unique PN code to generate PN sequences (containing the traffic). The high speed PN modulation allows many different paths to be separated provided the difference in path delays exceed the inverse of the PN chip rate (i.e. 1/PN rate), typically called a PN chip duration.

However, the PN codes and the resulting sequences are not orthogonal. For short time intervals (e.g. an information bit), the cross correlations between different PN codes and the cross correlations between different PN sequences are random with a binomial distribution. Consequently, the traffic carried in each code channel typically interferes with the traffic carried in other code channels. To reduce the mutual interference and allow higher system capacity, many CDMA communications systems also modulate the traffic carried in each code channel with orthogonal binary sequences, such as Walsh codes, from a set of a fixed number of mutually orthogonal binary sequences. Each orthogonal binary sequence has a corresponding index symbol. For example, in a CDMA communications system, defined by the IS-95A standard, 64 different Walsh codes are used. Consequently, every six bits of data traffic corresponds to one of the index symbols and are mapped to one of the 64 Walsh codes. The use of Walsh codes reduces the mutual interference and increases the system capacity to carry traffic.

The base stations typically send in each forward CDMA channel, one or more pilot signals which are used by receivers in the mobile stations to coherently demodulate the traffic carried in the forward CDMA channels. However, due to power considerations, the mobile stations do not typically send a pilot signal to the base stations. (e.g. in IS-95A CDMA communications systems, the mobile stations do not send pilot signals to the base stations). Consequently, receivers at the base stations must typically use non-coherent demodulation techniques to demodulate or detect the traffic sent in the reverse traffic channels within each reverse CDMA channel).

Since, by its inherent nature, it is more difficult to demodulate traffic using non-coherent demodulation than using coherent demodulation techniques, the capacity of many CDMA communications systems to handle traffic is limited by the ability of the receivers at the base station to detect error free the traffic carried in the reverse traffic channels (within each reverse CDMA channel) using non-coherent demodulation techniques. Consequently, the capacity of many CDMA communications systems is limited by the performance of the receivers used at the base stations.

Each base station has at least one receiver with at least one antenna. Since each receiver typically services only one mobile station at a time, each base station typically has a plurality of receivers, one for each mobile station to be serviced simultaneously. Each receiver at the base station typically has a receiver section, a detector section and a decoder section.

A conventional approach used to maximize the performance of the receivers at the base stations is to optimize separately the detector section and the decoder section of each receiver.

With many CDMA communications systems, the mobile stations first encode the data bits of the traffic to data symbols at a fixed encoding rate using an encoding algorithm which facilitates subsequent maximum likelihood decoding of the data symbols into data bits by a decoder in the decoder section. Furthermore, the mobile stations also typically interleave the data symbols using an interleaver to generate interleaved data symbols. The interleaving of the data symbols helps reduce the deleterious effects of multipath fading and improve the performance of the decoder section.

The mobile stations then map (or encode) the interleaved data symbols (containing the traffic) into orthogonal codes from a set of mutually orthogonal codes, such as Walsh codes. The use of orthogonal codes facilitates the detection of each data symbol carried in respective code channel by the detector and decoder sections of the receiver at the base station.

For each antenna at a base station, a single maxima receiver or a dual maxima receiver is commonly used. Each single maxima receiver and each dual maxima receiver commonly uses a rake receiver design. Such a design has two or more fingers, each finger receives and detects signals carried on one of the paths.

Referring to FIGS. 2 and 3, a single maxima receiver 300 of the rake receiver design consists of an antenna 310, a receiver section 320, a detector section 330 and a decoder section 340. (Alternatively, more than one antenna 310 may be used for space or path diversity reception). The receiver section 320 is connected to the antenna 310 and to the detector section 330. The decoder section 340 is connected to the demodulator section 330.

The receiver section 320 consists of one receiver subsection. (If more than one antenna 310 is used, multiple receiver subsections would be employed, one for each antenna 310). Each receiver subsection consists of a searcher receiver and and three data receivers. More or less than three data receivers can be used. (However, each receiver section must have one searcher receiver and at least one data receiver). For each RF signal sent by the mobile station, the searcher receiver searches the received spread-spectrum RF signals arriving via the various reverse paths at the antenna 310 for the strongest spread-spectrum RF signals associated with the mobile station. The searcher receiver then instructs the data receivers to track and receive the RF signals carried in the reverse paths with the strongest levels. Each data receiver typically receives and tracks a separate RF signal. In particular, each data receiver demodulates the respective spread-spectrum RF signal and translates the respective spread-spectrum RF signal from the RF frequency to a processed received signal at a lower frequency. Furthermore, each data receiver samples at the PN chip rate (e.g. 1.2288 msamples/sec) the respective processed received signal to generate respective data samples 325A, 325B and 325C for the detector section 330 of the receiver 300.

The detector section 330 of the single maxima receiver 300 consists of three detector subsections, a first subsection 400A, a second subsection 400B and a third subsection 400C. Each subsection 400A–C is associated with one of the data receivers in the receiver section 320. The combination of each data receiver with its corresponding subsection 400A–C is commonly called a finger of the single maxima receiver 300 (using rake receiver terminology). If more data receivers are employed (or if more receiver sub-sections are employed), then a corresponding additional number of subsections would be employed.

The detector subsection 400A consists of a demodulator 410, a Walsh transformer circuitry 420 and squaring and summing circuitry 430. The Walsh transformer circuitry 420 is connected to the demodulator 410 and to the squaring and summing circuitry 430. The detector subsection 400A typically demodulates groups of samples 325A of the processed received signal into two groups of samples of subsignals using a demodulator—one group of samples 412 of an in phase signal and one group of samples 414 of a quadrature phase signal. The two groups of samples 412, 414 of subsignals are transformed into a block of complex transformer output signals 425 using the Walsh transformer circuitry 420. Typically, the Walsh transformer circuitry 420 consists of two fast Hadamard Transformers (FHT) which transform each group of samples 412 of the in phase signal and each group of samples 414 of the quadrature phase signal into two separate blocks of transformer output signals. The two blocks of transformer output signals are commonly represented as one block of complex transformer output signals 425 (i.e. using complex mathematics). A block of complex transformer output signals 425 may be called a transformer block.

Since Walsh codes are typically used in a CDMA communications system, a block of complex transformer output signals 425 is sometimes called a Walsh block. Each row of the block of complex transformer output signals 425 is a complex transformer output signal 425 (comprising one row of transformer output signals associated with the in phase signal and a corresponding row of transformer output signals associated with the quadrature phase signal).

Each block of complex transformer output signals 425 is carried to the squaring and summing circuitry 430 which converts each block of complex transformer output signals 425 into groups of energy values 445A (or decision values). Each energy value 445A within the group of energy values 445A associated with a particular group of samples 325A of the processed received signal represents a measure of confidence that the group of samples 325A of the processed received signal corresponds to a particular orthogonal code with a corresponding index value. Consequently, each row of the block of complex transformer output signals 425 (i.e. each transformer output signal) corresponds to a measure of confidence that a particular group of sampled signals 325A corresponds to a particular orthogonal code from within the set of mutually orthogonal codes. Since each orthogonal code from the set of mutually orthogonal codes has a corresponding index symbol, each energy value 445A has an associated index symbol.

Similarly, the other fingers generate groups of energy values 445B and 445C associated with groups of samples 325B and 325C respectively.

The detector subsections 400A–C are sometimes called correlator detectors since they correlate samples of the received signal with one of the orthogonal codes (e.g. one of the Walsh codes).

The energy values 445A–C from each finger is fed into the decoder section 340. The decoder section 340 of the receiver 300 attempts to recover the data bits originally sent. The decoder section 340 consists of a summer 500, a single maxima metric generator 540, a deinterleaver 550 and a decoder 560. The summer 500 is connected to the squaring and summing circuitry 430 is each finger and to the single maxima metric generator 540. The deinterleaver 550 is connected to the single maxima metric generator 540 and to the decoder 560.

Using the summer 500 in the decoder section 340, each group of energy values 445A from the first detector subsection 400A is directly added with other groups of energy values 445B, 445C from the other detector subsections 400B–C in the other fingers according to their associated orthogonal code (or index symbol) to create a group of combined energy values 505. The combined energy value 505 for each index symbol is fed into the single maxima metric generator 540.

Referring in particular to FIG. 3, the single maxima metric generator 540 consists of selector 515, an index mapper 520, a metric computor 525 and a multiplier 530. The selector 515 is connected to the summer 500, to the index mapper 520 and to the metric computor 525. The multiplier 530 is connected to the index mapper 520 and to the metric computor 525. The selector 515 selects the largest combined energy value 518 within each group of combined energy values 505. The largest combined energy value 505 represents the largest measure of confidence that the groups of samples 325A–C of the processed signal corresponds to one of the orthogonal codes (sometimes called the most likely orthogonal code sent by the mobile station). (i.e. Since each orthogonal code has a corresponding index symbol, the largest combined energy value 518 represents the largest measure of confidence that the groups of samples 325A–C of the received signal corresponds to one of the index symbols). The selector 515 also selects the symbol 517 (or index symbol) associated with the largest combined energy value 518 (i.e. the most likely orthogonal code). The index symbol 517 selected is carried to the index mapper 520 which maps the index symbol 517 into a plurality of "1" and "−1" soft decision bits 522. The largest combined energy value 518 is carried to the metric computor 525 which generates a scaling factor 527. The multiplier 530 then scales the soft decision bits 522 by the scaling factor 527 to produce soft decision data 545. The first bit in the soft decision data 545 represents a measure of confidence of the value of the first digit of index symbol (corresponding to the most likely orthogonal code). In other words, the first bit in the soft decision data 545 represents a measure of confidence of the value of the first digit of the interleaved data symbol actually sent. The second bit in the soft decision data 545 represents a measure of confidence of the value of the second digit of the index symbol (corresponding to the most likely orthogonal code) of the interleaved data symbol actually sent, etc.

The soft decision data 545 is carried to the deinterleaver 550. The deinterleaver 550 deinterleaves the soft decision data 545 generating deinterleaved soft decision data 555.

The deinterleaved soft decision data 555 is then carried to a decoder 560 (typically a viterbi decoder) which decodes' the deinterleaved data 555 into estimated digital traffic data bits 565.

Sometimes the base stations use simple single maxima receivers that do not use the rake receiver design. Such receivers only have one finger.

The method used by a simple single maxima receiver to generate the largest combined energy value for the $k^{th}$ block of complex transformer output signals r can be represented mathematically fairly easily as follows:

$$\text{largest energy value}_k = \max\{|r_{k,1}|^2, |r_{k,2}|^2 |r_{k,n}|^2\}$$

where n is the total number of orthogonal codes used.

A single maximum receiver is disclosed in U.S. Pat. No. 5,109,390 entitled "Diversity Receiver in CDMA Cellular Telephone System" and issued to the Qualcomm Incorporated on Apr. 28, 1992. This patent is incorporated by reference herein in its entirety.

To increase the system capacity, some CDMA communications systems use receivers typically called dualmaxima receivers. Dual-maxima receivers have improved bit error performance than single-maxima receivers. The dual-maxima receiver may or may not use a rake receiver design.

Referring to FIG. 4, a dual maxima receiver 600 of the rake receiver design consists of an antenna 310', a receiver section 320', a detector section 330' and a decoder section 605. The antenna 310', the receiver section 320', the detector section 330' are identical to the antenna 310, the receiver section 320 and the detector section 330 found in the single maxima receiver 300 and operate in exactly the same way. The detector section 330' has three detector subsection 400A', 400B' and 400C' which are identical to the detector subsection 400A, 400B and 400C found in the single maxima receiver 300 and operate in exactly the same way.

However, the dual maxima receiver has a different decoder section 605. The decoder section 605 consists of a summer 500', a dual maxima metric generator 610, a deinterleaver 550' and a decoder 560'. The summer 500', the deinterleaver 550' and the decoder 560' are identical to the summer 500, the deinterleaver 550 and the decoder 560 found in the single maxima receiver 300 and operate in exactly the same way. However, the single maxima generator 540 found in the single maxima receiver 300 is replaced with the dual-maxima metric generator 610. The summer 500' is connected to each detector subsection 400A'–C' in the detector section 330' and to the dual maxima metric generator 610. The deinterleaver 550' is connected to the dual maxima metric generator 610 and to the decoder 560'.

The receiver section 320' has a searcher receiver and three data receivers. The searcher receiver instructs the data receivers to track and receive the strongest spread-spectrum RF signals associated with the mobile station. Each data receivers receives a separate RF signal. In particular, each receiver demodulates the RF signal and translates the RF signal to a processed received signal. Each data receiver in the receiver section 320' generates groups of samples 325A', 325B'and 325C' respectively of the respective processed received signal for each respective detector subsection 400A', 400B' and 400C'.

In the same way as previously described with the single maxima receiver 300, a demodulator 410' and Walsh transformer circuitry 420' transform groups of samples 325A' of the processed received signal into blocks of complex transformer output signals 425', a block of complex transformer output signals for each group of samples 325A' of the processed received signal. Each block of complex transformer output signals 425' is converted into a group of energy values 445A' by a squaring and summing circuitry 430' in the same way as previously described for the single maxima receiver 300. Each energy value 445A' within a group of energy values 445A' associated with a group of samples 325A' represents the measure of confidence that the group of samples 325A' of the received signal corresponds to a particular orthogonal code. Since each orthogonal code has a corresponding index symbol, each energy value 445A' within a group of energy values 445A' associated with a group of samples 325A' represents the measure of confidence that the group of samples 325A' of the processed received signal corresponds to a particular index symbol. Similarly, the other fingers generate groups of energy values 445B' and 445C' associated with groups of samples 325B' and 325C' respectively. The groups of energy values 445A'–C' from each finger are carried to the decoder section 605.

Using the summer 500' in the decoder section 605, each group of energy values 445A' is directly added with other groups of energy values 445B'–C' from the other detector subsections 400B'–C' according to their associated orthogonal code (or index symbol) to create a group of combined energy values 505'. The combined energy value 505' for each index symbol is fed into the dual maxima metric generator 610 which uses a dual-maxima decoding algorithm (which approximates the maximum a posteriori (MAP) decoding algorithm). After acquiring a complete group of combined energy values 505', one combined energy value 505' for each index symbol, the dual-maxima metric generator 610 first searches for the largest combined energy value 505' in a first subset of the group of combined energy values 505' which have associated index symbols having "0" as the first digit. The dual-maxima metric generator then searches for the largest combined energy value 505' in a second subset of the group of combined energy values 505' which have associated index symbols having "1" as a first digit. The difference in the largest combined energy value 505' in the first subset with the largest combined energy value 505' in the second subset is output from the dual-maxima metric generator 610 as the first bit of soft decision data 545' for the first digit of the index symbol corresponding to the most likely orthogonal code. In other words, the first bit in the soft decision data 545' represents a measure of confidence of the value of the first digit of the interleaved data symbol actually sent.

Next, the dual-maxima metric generator searches for the largest combined energy value 505' in a third subset of the group of combined energy values 505' which have associated index symbols having "0" as a second digit and searches for the largest combined energy value 505' in the fourth subset of the group of combined energy values 505' which have associated index symbols having "1" as the second digit. The difference in the largest combined energy values is output as the second bit of soft decision data 545' for the second digit of the index symbol corresponding to the most likely orthogonal code. In other words, the second bit in the soft decision data 545' represents a measure of confidence of the value of the second digit of the interleaved data symbol actually sent.

This process continues until the dual-maxima metric generator 610 generates soft decision data 545' for the last digit in the index symbol most likely sent.

The soft decision data 545' for all the digits of the index symbol most likely sent is then carried to the deinterleaver 550'. The deinterleaver 550' de-interleaves the soft decision data 545' generating deinterleaved soft decision data 555'. The deinterleaved soft decision data 555' is then carried to the decoder 560' (typically a viterbi decoder) which decodes the deinterleaved soft decision data 555' into estimated digital traffic data bits 565'.

Sometimes the base stations use simple dual maxima receivers that do not use the rake receiver design. Such receivers only have one finger.

The method used by simple dual maxima receivers to generate the soft decision data for the $k^{th}$ block of transformer output signals can be represented mathematically fairly easily as follows:

$$\Delta_{k,i} = \max\{|r_{k,m}|^2, m \in S_i\} - \max\{|r_{k,m}|^2, m \in \overline{S}_i\}$$

$$1 \leq I \leq n$$

where $S_i = \{$all m, $i^{th}$ corresponding bit is "0"$\}$ and
$\overline{S}_i = \{$all m, $i^{th}$ corresponding bit is "1"$\}$ and where n is a function of the total number of orthogonal codes used and where $\Delta_{k,i}$ is the $i^{th}$ soft decision bit of the soft decision data associated $k^{th}$ block of transformer output signals. (e.g. if 64 orthogonal codes are used, then n equal six).

A dual-maxima receiver is described in U.S. Pat. No. 5,442,627 entitle "Non-Coherent Receiver Employing a Dual-Maxima Metric Generation Process" and issued to Qualcomm Incorporated on Aug. 15, 1995. The patent is incorporated by reference herein in its entirety.

Despite the improved bit error performance of the dual-maxima receiver over the single maxima receiver, there is still a need for an improved receiver with even better bit error performance than offered with the dual-maxima receiver. Such an improved receiver is needed to increase the system capacity of CDMA communications systems and better utilize the scarce RF spectrum.

SUMMARY OF THE INVENTION

It is an object of the present invention to provide an improved method and apparatus for receiving orthogonal signals.

In accordance with one aspect of the present invention, there is provided in a receiver having a demodulator which provides groups of de-spread samples of a processed received signal, a method of detecting orthogonal codes carried in the processed received signal. The method comprises passing the groups of de-spread samples through an orthogonal code transformer to provide sequential transformer blocks and carrying out a summing, squaring and selection operation over a sequential plurality of transformer blocks to obtain a desired orthogonal code from each of the transformer blocks of the sequential plurality of transformer blocks.

In accordance with another aspect of the present invention, there is provided an apparatus for decoding an orthogonally encoded data signal carrying a plurality of orthogonal codes wherein each orthogonal code is from a set containing a fixed number of possible orthogonal codes. The apparatus comprises buffering means for buffering a sequential plurality of transformer blocks. Each transformer block has a plurality of transformer signals, one transformer signal for each of the orthogonal codes in the set of possible orthogonal codes. The apparatus further comprises decoding means for determining the desired orthogonal code from each of the transformer blocks of the sequential plurality of transformer blocks wherein the decoding means uses transformer signals from each of the transformer blocks in the sequential plurality of transformer blocks to determine each of the desired orthogonal codes.

DETAILED DESCRIPTION OF THE DRAWINGS

A detailed description of the preferred embodiments of the present invention is provided below with reference to the following drawings, in which.

DETAILED DESCRIPTION OF THE PREFERRED EMBODIMENTS

Figure 1:
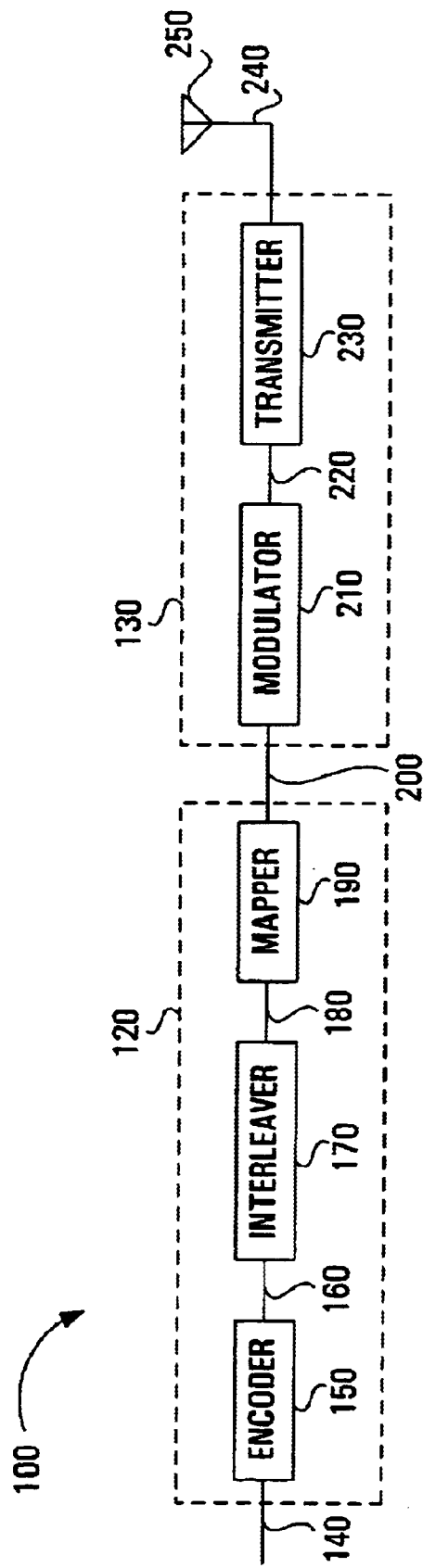
FIG. 1 is a block diagram of a conventional transmitter used by a mobile station in a CDMA communications network.

Referring to FIG. 1, in a conventional CDMA communications system, each mobile station sends traffic typically to the closest base station using a transmitter 100. The transmitter 100 consists of an encoding section 120 and modulating and transmitting section 130. The encoding section 120 is connected to the modulating and transmitting section 130. The transmitter 100 does not send a pilot (or reference) signal.

The encoding section 120 of the transmitter 100 consists of an encoder 150, an interleaver 170, and a mapper 190. The encoder 150 is connected to the interleaver 170 which is connected to the mapper 190. The modulating and transmitting section 130 consists of a modulator 210, a transmitter 230 and an antenna 250. The modulator 210 is connected to the transmitter 230 and the mapper 190. The transmitter 230 is connected to the antenna 250.

The transmitter 100 sends digital traffic comprising traffic digital data bits 140. If the traffic is originally in analog form (i.e. analog traffic), such as voice, then an analog to digital (A/D) converter or similar device is first employed to convert the analog traffic to digital traffic (comprising traffic digital data bits 140). The digital traffic data bits 140 are fed into the encoding section 120 of the transmitter 100 typically at 9600 kbits/sec. (Other speeds may be used). In particular, the traffic digital data bits 140 are first fed into the encoder 150 which encodes the traffic digital data bits 140 into data symbols 160 using an encoding algorithm which facilitates the maximum likelihood decoding of the received traffic by the base station serving the mobile station. The encoder 150 typically uses a convolution encoding algorithm. (Other algorithms may be used such as block coding algorithms). The encoder outputs the data symbols 160 at a fixed encoding rate of one data bit to three data symbols. (Other encoding rates such a one data bit to 2 data symbols may be used). The encoder 150 typically outputs the data symbols 160 at 28.8 ksym/sec (other symbol rates may be used depending on the speed of the traffic digital data bits 140 being fed into the encoder 150 and the encoding rate). The data symbols 160 are fed into the interleaver 170 which block interleaves the data symbols 160 at the symbol level. The interleaver 170 fills a matrix of a predetermined size with the data symbols 160 in a column by column basis. The preferred predetermined size of the matrix is 32 rows by 18 columns (i.e. 576 cells). The size of the matrix depends on the length of a transmission block and the speed of the data symbols 160 sent from the encoder 150. The preferred length of a transmission block is 20 milliseconds (as specified by the ANSI J-STD-008 Standard). Consequently, since the preferred encoder outputs the data symbols 160 at 28.8 ksym/sec, the matrix must hold 576 data symbols 160 (i.e. 28.8 ksym/sec times 20 ms). Hence, a matrix of 18 by 32 is used.

The interleaver 170 outputs interleaved data symbols 180 from the matrix in a row by row manner at the same rate the data symbols 160 were inputted in the interleaver 170 (e.g. 28.8 ksym/sec). The interleaved data symbols 180 are fed into the mapper 190. The mapper 190 maps (or encodes) every group of 6 interleaved data symbols 180 into a corresponding Walsh code 200 from a group of 64 Walsh codes 200. Each Walsh code 200 is 64 bits long. (Alternatively, orthogonal codes other than Walsh codes can be used. Furthermore, the mapper 190 may map more or less than six interleaved data symbols 180 into a corresponding orthogonal code depending on the length of the orthogonal codes selected). The mapper 190 outputs the Walsh codes 200 typically at a fixed rate of 307.2 ksymbols/sec. (Alternatively, other symbol rates can be used depending on the rate the interleaver 170 outputs interleaved data symbols 180 and the length of the orthogonal codes used).

A frame of data symbols 160 (or a frame of interleaved data symbols 180) completely fills the matrix of the predetermined size used by the interleaver 170 (i.e. 576 cells in this case). Since the encoder 150 outputs the data symbols 160 at a fixed encoding rate of one data bit to three data symbols, 192 traffic digital data bits 140 are needed. (i.e. a frame of digital traffic data bits 140 has 192 bits). Since every group of 6 interleaved data symbols 180 are mapped into an orthogonal code, every frame of interleaved data symbols 180 is represented by 96 orthogonal codes.

The Walsh codes 200 are fed into the modulating and transmitting section 130 of the transmitter 100. In particular, the Walsh codes 200 are first fed into the modulator 210. The modulator 210 first spreads each Walsh code 200 with a long binary pseudo noise (PN) code in order to generate a pseudo noise (PN) sequence. Each mobile station is assigned a unique long binary pseudo noise PN code with which to spread the Walsh code 200. (Alternatively, other long spreading codes may be used other than long binary PN codes). The long binary PN codes not only identify the mobile station but also enhance security by scrambling the traffic. The modulator 210 outputs the PN sequences at a high fixed PN chip rate (typically 1.228 mchips/sec). The resulting PN sequences facilitate the base station servicing the mobile station to discriminate or detect the RF signals carried on different reverse paths.

The modulator 210 then spreads the PN sequences with a pair of different short spreading codes (of the same length) in order to generate in-phase channel (or I-phase channel) and quadrature phase channel (or q-phase channel) spread sequences 220.

The I-phase channel and the q-phase channel spread sequences 220 are then fed into the transmitter 230. The I-phase channel and the q-phase channel spread sequences 220 biphase modulate a quadrature pair of sinusoids. The sinusoids are summed and bandpassed limited with a bandpass filter. The bandpassed limited summed sinusoids modulate a RF carrier (which may be amplified) to generate a spread spectrum RF signal 240 which is radiated by the antenna 250.

The spread spectrum RF signal is received by a receiver at the base station. Each base station typically has a plurality of receivers, one for each mobile station to be serviced. The spread spectrum RF signal commonly arrives at the base station servicing the mobile station as a plurality of spread spectrum RF signals travelling on a plurality of different reverse paths.

In a conventional CDMA communications system, the receivers are typically single maxima or dual maxima receivers. However, both the single maxima receiver and the dual maxima receivers detect one index symbol from the corresponding transformer block (e.g. Walsh block), one Walsh block at a time (i.e. only using the one corresponding transformer block). The performance of the receivers at the base station can be improved significantly by detecting a plurality of index symbols' all at once using a respective plurality of transformer blocks (e.g Walsh blocks).

Figure 5:
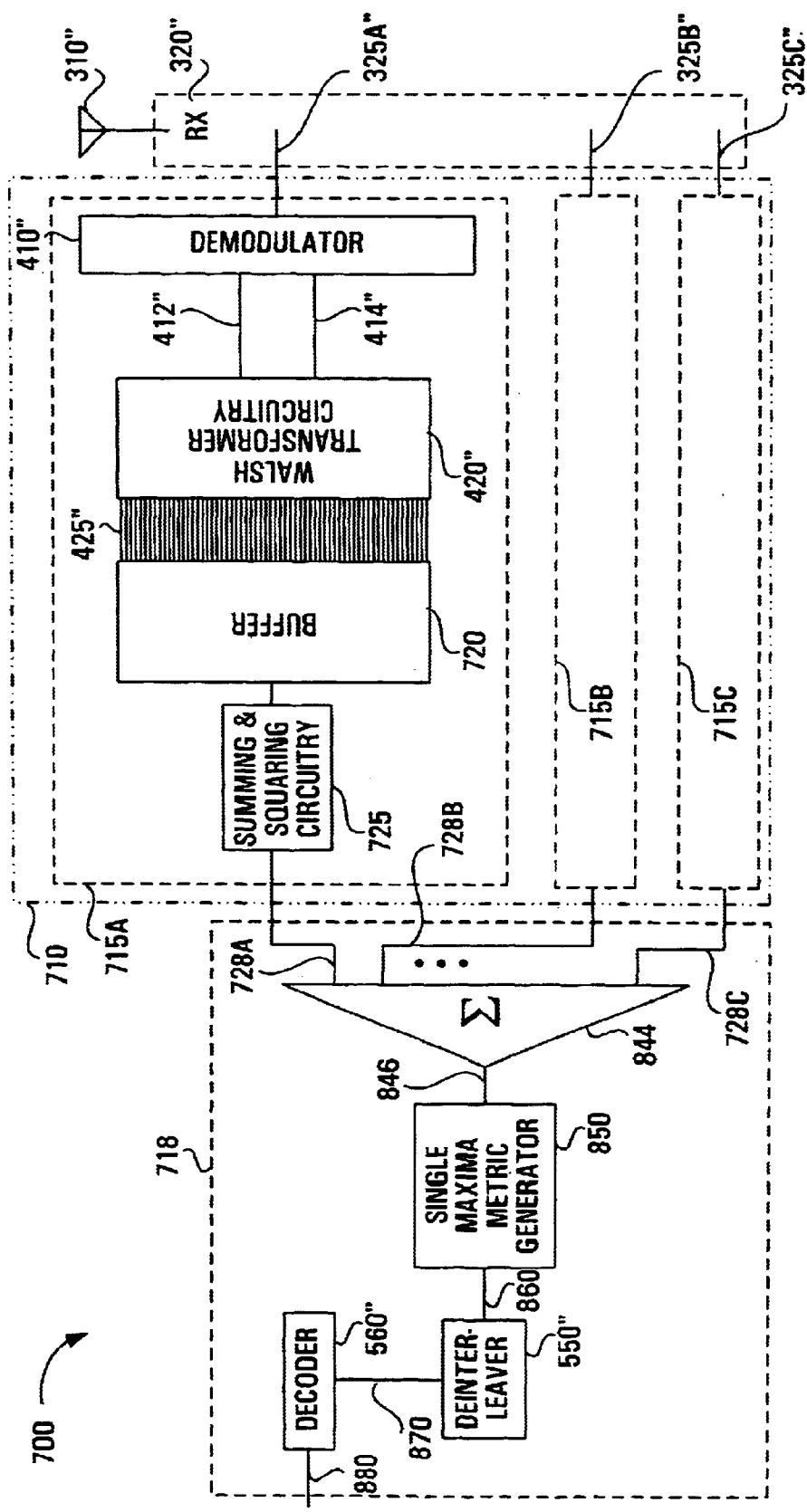
FIG. 5 is a block diagram of a single maxima block detection receiver used by a base station in accordance with a first preferred embodiment of the present invention.

In accordance with the first preferred embodiment of the present invention, a single-maxima block detection receiver 700 of the rake receiver design is provided. Referring to FIG. 5, the single-maxima block detection receiver 700 consists of an antenna 310", a receiver section 320", a detector section 710, and decoder section 718. (Alternatively, more than one antenna 310' ' may be used for space or path diversity reception). The receiver section 320" is connected to the antenna 310" and to the detector section 710. The decoder section 718 is connected to the detector section 710.

Figure 2:
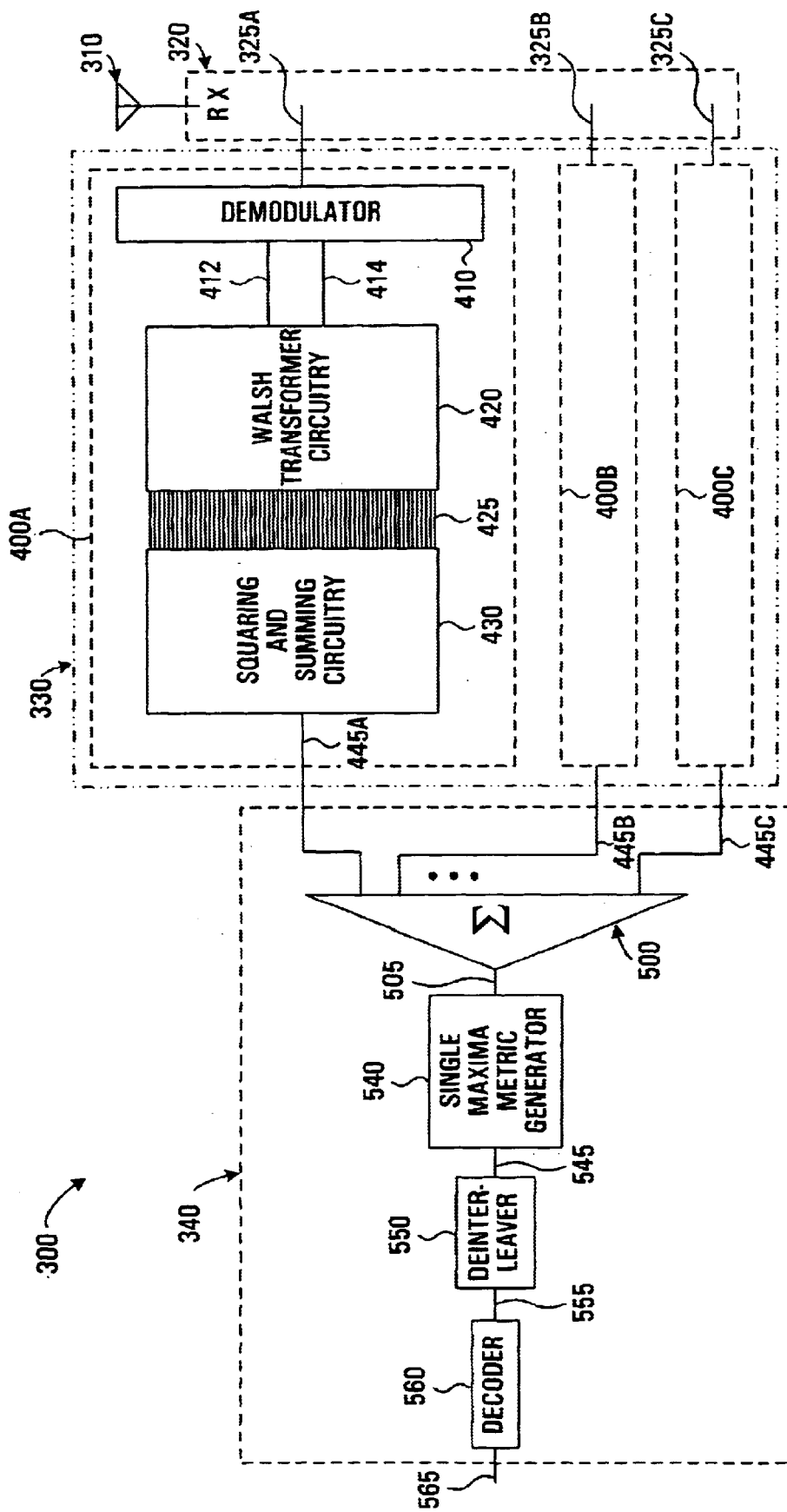
FIG. 2 is a block diagram of a conventional single maxima receiver used by a base station in a CDMA communications network.

The antenna 310' ' and the receiver section 320" are identical to the antenna 310 and to the receiver section 320 found in the single maxima receiver 300 shown in FIG. 2 and operate in exactly the same way.

In particular, the receiver section 320" consists of one receiver subsection. (If more than one antenna 310" is used, multiple receiver subsections would be employed, one for each antenna 310"). Each receiver subsection consists of a searcher receiver and three data receivers. More or less than three data receivers can be used. (However, each receiver section must have one searcher receiver and at least one data receiver). For each RF signal sent by the transmitter 100 of a mobile station, the searcher receiver searches the received spread-spectrum RF signals arriving via the various reverse paths for the strongest spread-spectrum RF signals associated with the transmitter 100 of the mobile station (as identified by the PN code). The searcher receiver then instructs the data receivers to track and receive the RF signals carried in the reverse:paths with the strongest levels. Each data receiver typically receives and tracks a separate RF signal. In particular, each data receiver demodulates the respective spread-spectrum RF signal and translates the respective spread-spectrum RF signal from the RF frequency to a respective processed received signal at a lower frequency. Furthermore, each data receiver samples at the PN chip rate (e.g. 1.2288 msamples/sec) the respective processed received signal to generate respective data samples 325A", 325B" and 325C" for the detector section 710 of the receiver 700.

The detector section 710 consists of three detector subsections 715A, 715B and 715C, one detector subsection 715 for each data receiver in the receiver subsection 320' '. The number of detector subsections 715 can vary depending on the number of data receivers in the receiver section 320' '. The combination of the data receiver with its corresponding detector subsection 715A–C is commonly called a finger.

Referring in particular to the first finger, the detector subsection 715A consists of a demodulator 410", Walsh transformer circuitry 420" " and a buffer 720. The Walsh transformer circuitry 420" is connected to the demodulator 410" and to the buffer 720. The buffer 720 is connected to the summing and squaring circuitry 725. The demodulator 410" and the Walsh transformer circuitry 420" " are identical to the demodulator 410 and the Walsh transformer circuitry 420 found in the single maxima receiver 300 and operate in exactly the same way.

In particular, referring in particular to the first finger, data samples 325A" from the first data receiver (which is part of the receiver section 320") are fed into the demodulator 410". The demodulator 410" de-spreads the processed received signal by correlating the processed received signal with long PN code associated with the mobile station and the short spreading codes. In particular, the demodulator 410" produces samples 412" of the in-phase signal and corresponding samples 414" of the quadrature phase signal. The samples 412" of the in-phase signal and the samples 414" of the quadrature phase signal are carried to the Walsh transformer circuitry 420". For every group of 64 samples 412" of the in-phase signal and for every corresponding group of 64 samples 414" of the quadrature phase signal, the Walsh transformer circuitry 420" generates a block of 64 complex transformer output signals 425". (The block may be called a transformer block).

Each block of complex transformer output signals 425" is associated with a complete block of Walsh codes. Furthermore, each complex transformer output signal 425" is a complex signal. That is, one element of the transformer output signal is 64 bits associated with the samples 412" of the in-phase signal and the other element of the transformer output signal is another 64 bits associated with the samples 414" of the quadrature phase signal. (If more or less than 64 orthogonal codes are used, then the number of bits in each element of the transformer output signal 425' ' vary accordingly). The Walsh transformer circuitry 420" typically comprises two Walsh transformers (such as two Fast Hadamard Transformers (FHT's)). One Walsh transformer is used to generate the elements of the transformer output signal 425" associated with the in-phase signal; and the other Walsh transformer is used to generate the elements of the transformer output signal 425" associated with the quadrature signal.

Each block of transformer output signals 425" is carried from the Walsh transformer circuitry 420" to the buffer 720 in parallel fashion. (Alternatively, each transformer output signal in a transformer block may be carried to the buffer 720 serially). The buffer 720 buffers three blocks of transformer output signals 425". (Alternatively, more or less than three blocks of transformer output signals 425" may be buffered; however, at least two blocks must be buffered). The three transformer blocks may be called a set of transformer blocks.

When the buffer 720 is full (i.e. contains three blocks of transformer output signals 425"), all the blocks of transformer output signals 425" " in the buffer 720 (i.e. associated with the three blocks of Walsh codes) are carried to the summing and squaring circuitry 725 (typically in a parallel fashion).

The summing and squaring circuitry 725 adds together one transformer output signal from each transformer block in every possible combination to generate a group of summed signals. In this case, since 3 transformer blocks are used, each transformer block having 64 transformer signals, the summing and squaring circuitry will generate 262,144 possible combinations (64×64×64).

Each summed signal in the group of summed signals is squared to generate a group of decision values (or energy values) 728A. Similarly, the other fingers generate groups of decision values (or energy values) 728B–C associated with groups of samples 325B" and 325C".

The decision values (or energy values) 728A, 728B and 728C from each finger are carried to the decoder section 718. The decoder section 718 consists of a summer 844, a single maxima metric generator 850, a de-interleaver 550", and a decoder 560". The single maxima metric generator 850 is connected to the summer 844 and to the deinterleaver 550". The summer 844 is connected to each detector subsection 715A–C. The de-interleaver 550" is connected to the decoder 560".

Figure 6:
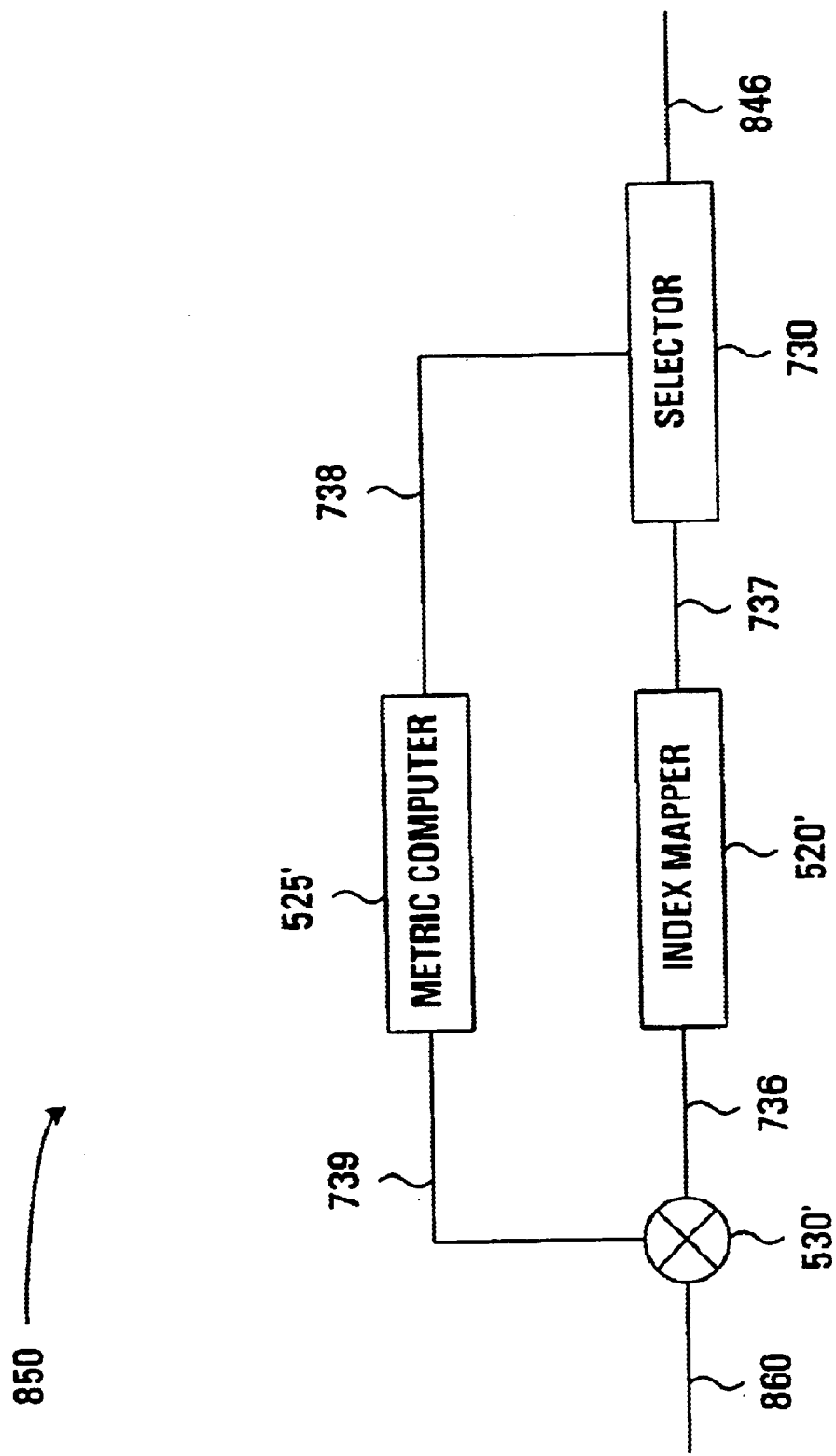
FIG. 6 is a block diagram of a single maxima metric generator used by the single maxima block detection receiver shown in FIG. 5.

Referring in particular to FIG. 6, the single maxima metric generator 850 consists of a selector 730, an index mapper 520', a metric computor 525' and a multiplier 530'. The selector 730 is connected to the metric computor 525' and to the index mapper 520'. The metric computor 525' and the index mapper 520' are connected to the multiplier 530'. The metric computor 525', the index mapper 520' and the multiplier 530' are identical to the metric computor 525, the index mapper 520 and the multiplier 530 in the single maxima receiver 300 shown in FIG. 3 and operate in exactly the same way.

In operation, the decision values 728A, 728B and 728C in each group of decision values are directly added together according to their associated orthogonal codes (or index symbols) by the summer 844 to generate a group of combined decision values 846. (e.g. the decision value from a finger comprising the square of the sum of the first row, fifth and eighteenth row of the transformer blocks is added with squared summed signals [each comprising the square of the sum of the first row, fifth and eighteenth row of the transformer blocks) from the two other fingers and so on).

Figure 3:
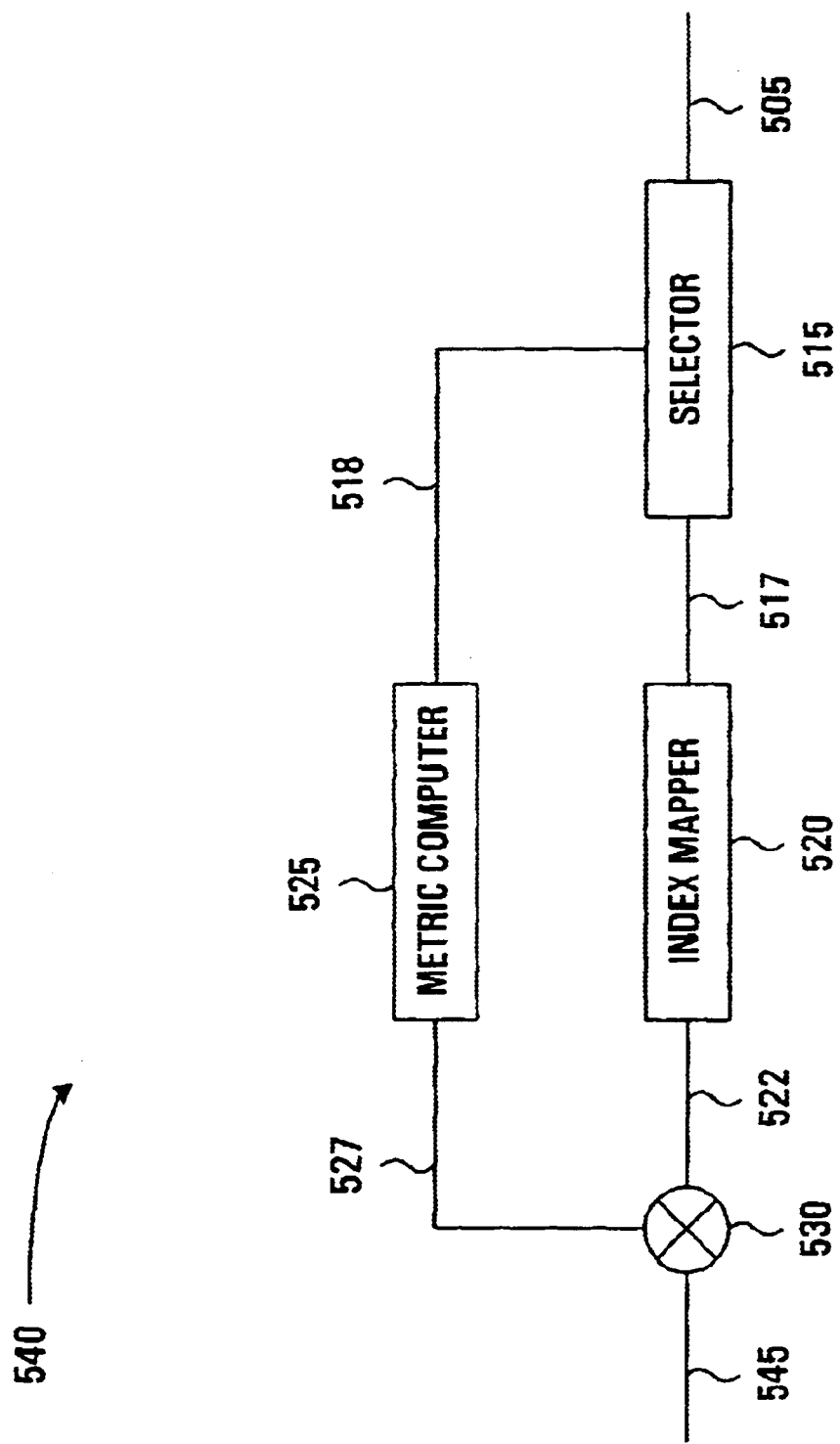
FIG. 3 is a block diagram of a single maxima metric generator used by a single maxima receiver shown in FIG. 2.

The combined decision values 846 are then carried to the single maxima metric generator 850 which operates in a similar way as the single maxima metric generator 540 found in the single-maxima receiver 300 shown in FIG. 2 and 3. The selector 730 then selects the largest combined decision value 738 from the group of combined decision values 846 which is carried to the metric computor 525'. The metric computor 525' then scales the largest combined decision value 738 to generate a scaling factor 739.

The summed value, which was squared to generate the largest combined decision value 738, consists of three complex transformer output signals, a complex transformer output signal from each block of complex transformer output signals. Each transformer output signal has a corresponding index symbol 737. The three corresponding index symbols 737 are carried from the selector 730 to the index mapper 520'. It should be noted that the summing and squaring circuitry 725 need not generate and send to the selector 730 via the summer 844, the index symbols associated with the largest decision value 738 when the combined decision values 846 relating to the index symbols are presented to the selector 730 in a predetermined order.

The index mapper 520' maps each of the three index symbol into a plurality of "1" and "−1" soft decision bits 736. The soft decision bits 736 for each of the three index symbols and a scaling factor 739 are carried to the multiplier 530' which multiplies each of the soft decision bits 736 for each of the three index symbols by the scaling factor 739 to generate soft decision data 860 for each of the three index symbols 737. In particular, soft decision data 860 for each index symbol comprises six bits. The first bit of the soft decision data 860 for a particular index symbol represents a measure of confidence of the value of the first digit of the particular index symbol. In other words, the first bit of the soft decision data 860 for the first digit of a particular index symbol represents a measure of confidence of the value of the first digit of the respective interleaved data symbol 180 originally sent. The second bit of the soft decision data 860 for the second digit of a particular index symbol represents a measure of confidence of the value of the second digit of the particular index symbol, etc.

The soft decision data 860 is carried to the deinterleaver 550".

Using the same process as described above, more soft decision data 860 is generated from the next set of transformer blocks, and so on. The next set of transformer blocks is the set of transformer blocks containing as the first transformer block, the transformer block immediately following the last transformer block used in the previous set of transformer blocks. (i.e. none of the sets of transformer blocks contain transformer blocks from another set. e.g. If the 3rd, 4th and 5th transformer blocks are first used to generate soft decision data 860 then the 6th, 7th and 8th transformer blocks are used to generate more soft decision data 860).

The deinterleaver 550" deinterleaves the soft decision data 860 and generates the interleaved soft decision data 870. In particular, the soft decision data 860 is inputted into a matrix of the pre-determined size (i.e. 18 by 32) in a row by row manner. The de-interleaved soft decision data 870 is outputted from the matrix of the predetermined size in a column by column manner. The de-interleaved soft decision data 870 is outputted by the de-interleaver 550" " at the same speed that the soft decision data 860 was inputted into the de-interleaver 550" " (e.g. 28.8 kmetrics/sec).

The deinterleaved soft decision data 870 is then carried from the de-interleaver 550" to the decoder 560" which utilizes maximum likelihood decoding techniques to estimate digital traffic data bits 880. Typically, the decoder 560" is a viterbi decoder.

By buffering blocks of transformer output signals 425" and by selecting the largest decision value 738, the signal to noise ratio is increased thereby providing better bit error performance.

Alternatively, the rake receiver design need not be used. A simple single maxima block detection receiver simply uses one finger.

For the $k^{th}$ set of transformer blocks, the method used by the simple block detection receiver to determine the largest combined decision value (or largest energy value) can be described mathematically fairly easily as follows:

Largest Energy Value 738=$\max|r_{3k,j}+r_{3k+1,m}+r_{3k+2,n}|^2 1\leq j\leq 64, 1\leq m\leq 64, 1\leq n\leq 64$ where $r_{3k,j}$ ($1\leq j\leq 64$) are the 64 transformer output signals for the 3 kth transformer block, $r_{3k+1,m}$ ($1\leq m\leq 64$) are the 64 transformer output signals for the 3 k+1 transformer block and $r_{3k+2,n}$ ($1\leq n\leq 64$) are the 64 transformer output signals for the 3 k+2 transformer block.

Figure 7:
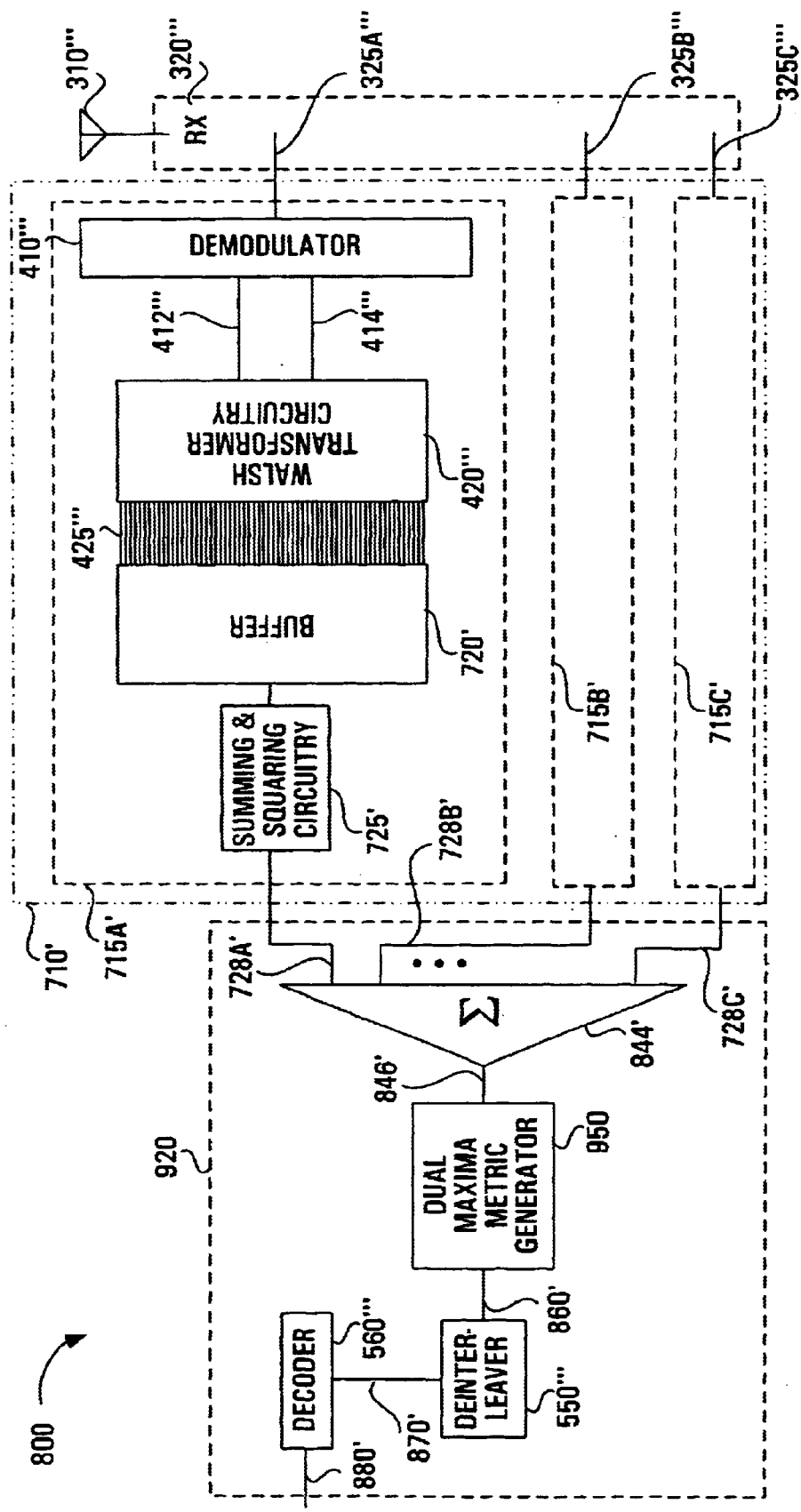
FIG. 7 is a block diagram of an dual maxima block detection receiver used by a base station in accordance with a second preferred embodiment of the present invention.

In accordance with a second preferred embodiment of the present invention, there is provided a dual-maxima block detection receiver 800 with three fingers. Referring to FIG. 7, the dual-maxima block detection receiver 800 consists of the receiver section 320''', a detector section 710' and a decoder section 920. The receiver section 320''' is connected to the detector section 710'. The detector section 710' is connected to the decoder section 920.

The receiver section 320''' has a searcher receiver and three data receivers. The receiver section 320''' is identical to the receiver section 320' in the dual maxima receiver 600 shown in FIG. 4 and operates in exactly the same way. That is, each data receiver in the receiver section 320''' provides groups of samples 325A''', 325B''' and 325C''' of the respective processed received signal to the detector section 710'.

The detector section 710' is the same as the detector section 710 used in the single maxima block detection receiver 700 and operates the same way. The detector section 710' consists of three detector subsection 715A', 715B' and 715C', one for each finger. The detector subsections 715A', 715B' and 715C' are identical to the detector subsections 715A, 715B and 715C used in the single maxima block detection receiver 700 and operate in exactly the same way. The number of detector subsections 715' can vary depending on the number of data receivers in the receiver section 320'''. As mentioned earlier, the combination of the data receiver with its corresponding detector subsection 715A'–C' is commonly called a finger. Each data receiver provides samples 325A'''–C''' of the processed received signals to the respective detector subsections 715A', 715B' and 715C'.

Each detector subsection 715A'–C' consists of the demodulator 410''', the Walsh transformer circuitry 420''', the buffer 720' and the summing and squaring circuitry 725'. The Walsh transformer circuitry 420''' is connected to the demodulator 410''' and to the buffer 720'. The buffer 720' is connected to the summing and squaring circuitry 725'.

The demodulator 410''', the Walsh transformer circuitry 420''', the buffer 720' and the summing and squaring circuitry 725' are identical to the demodulator 410'' the Walsh transformer circuitry 420'', the buffer 720 and the summary and sqaring circuitry 725 in the single maxima block detection receiver 700 and operate in exactly the same way as described for the single maxima block detection receiver 700 shown in FIG. 5. In particular, referring in particular to the first finger, groups of data samples 325A''' of the processed received signal are transformed into blocks of transformer output signals 425'''. Each block of transformer output signals 425''' is carried from the Walsh transformer circuitry 420''' to the buffer 720'. The buffer 720' buffers three blocks of transformer output signals 425'''. (Each block of transformer output signals 425''' is associated with a complete block of Walsh codes). Alternatively, more or less than three blocks of transformer output signals 425''' may be buffered; however at least two blocks of transformer output signals 425' " must be buffered.

When the buffer 720' is full (i.e. contains three blocks of transformer output signals 425'), all the blocks of transformer output signals 425''' in the buffer 720' (i.e. associated with three blocks of Walsh codes) are carried to the summing and squaring circuitry 725'.

The summing and squaring circuitry 725' adds together one transformer output signal from each transformer block in every possible combination to generate a group of summed signals. In this case, since three transformer blocks are used, each containing 64 transformer output signals, there are 262, 264 possible combinations (i.e. 64×64×64)

Each summed signal in the group of summed signals is squared to generate a group of decision values (or energy values) 728A'. Similarly, the other fingers generate groups of decision values (or energy values) 728B'–C'. Each group of decision values 728A', 728B' and 728C' from each finger is carried to the decoder section 820.

The decoder section 920 consists of a summer 844', a dual-maxima metric generator 950, a deInterleaver 550''' and a decoder 560'''. The dual-maxima metric generator 950 is connected to the summer 844' and to the deinterleaver 550'''. The deinterleaver 550''' is connected to the decoder 560'''. The summer 844' is also connected to each detector subsection 715A'–C'. The summer 844', the deinterleaver 550''' and the decoder 560''' are identical to the summer 844, the deinterleaver 550''' and the decoder 850' found in the single maxima block detection receiver 700 shown In FIG. 5 and operate in exactly the same way.

In operation, the decision values 728A', 728B' and 728C' in each group of decision values 728A'–C' are directly added together according to their associated orthogonal codes (or index symbols) by the summer 844' to generate a group of combined decision values 846'. (e.g. the decision value from a finger comprising the square of the sum of the first row, fifth and eighteenth row of the transformer blocks is added with squared summed signals [each comprising the square of the sum of the first row, fifth and eighteenth row of the transformer blocks) from the two other fingers and so on).

Figure 4:
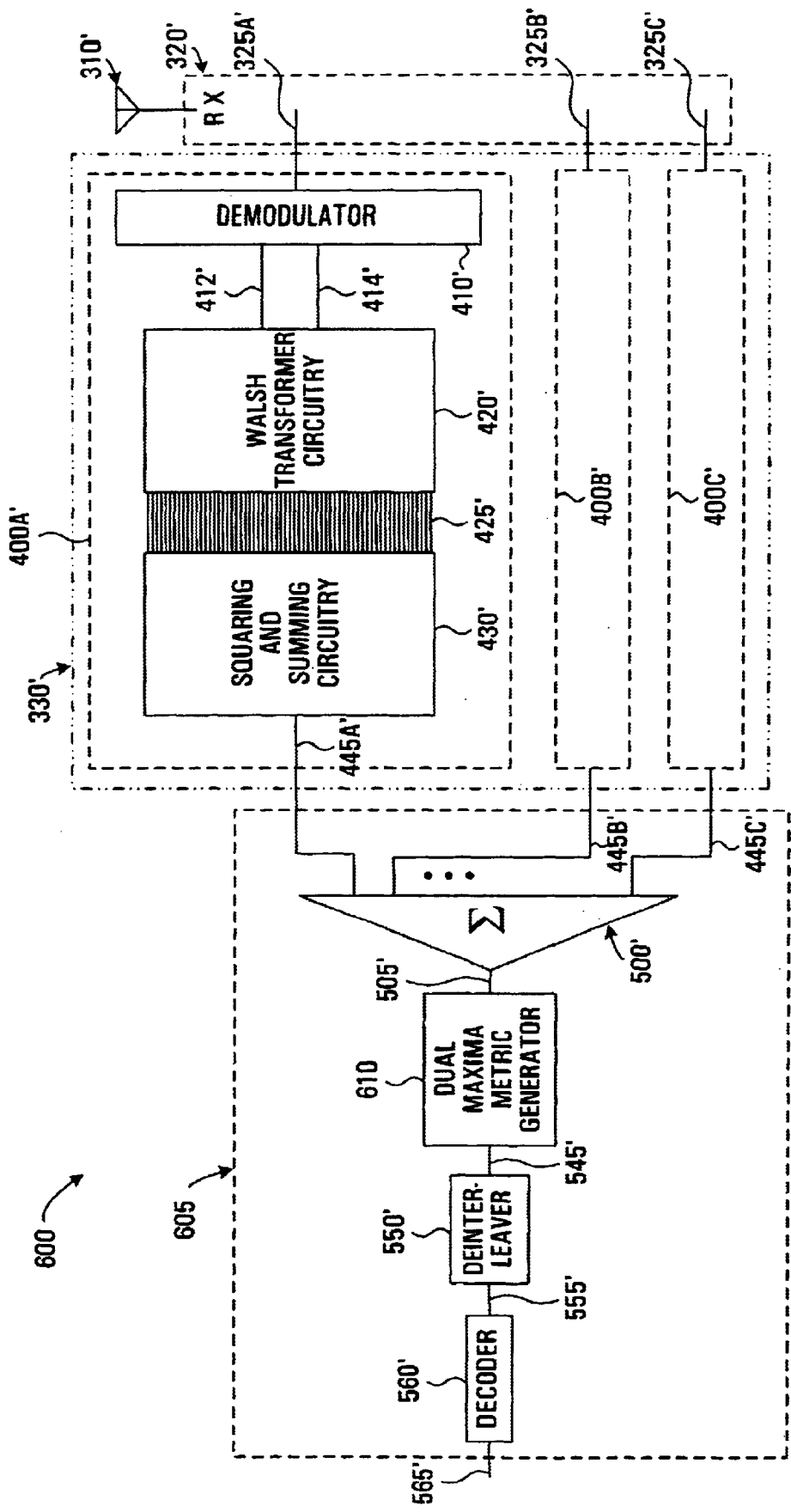
FIG. 4 is a block diagram of a conventional dual maxima receiver used by a base station in a CDMA communications network.

The combined decision values 846' are then carried to the dual-maxima metric generator 950 which operates in a similar way as the dual-maxima metric generator 610 found in the dual-maxima receiver 600 shown in FIG. 4. After acquiring a complete group of combined decision values 846', the dual-maxima metric generator 950 first searches for the largest combined decision value 846' in a first subset of the combined decision values 846' which have associated index symbols associated with the first transformer block having "0" as the first digit. The dual-maxima metric generator 950 then searches for the largest combined decision value 846' in a second subset of the set of combined decision values 846' which have associated index symbols associated with the first transformer block having "1" as a first digit. The difference in the largest combined decision value 846' in the first subset with the largest combined decision value 846' in the second subset is output from the dual-maxima metric generator 950 as soft decision data 860' for the first digit of the index symbol corresponding to the orthogonal code most likely sent and associated with the first transformer block. The soft decision data 860' for first digit of the index symbol represents a measure of confidence of the value of the first digit of the particular index symbol. In other words, the soft decision data 860' for the first digit of the index symbol represents a measure of confidence of the value of the first digit of the respective interleaved data symbol 180 originally sent.

Next, the dual-maxima metric generator 950 searches for the largest combined decision value 846' in a third subset of the set of combined decision values 846' which have associated index symbols associated with the first transformer block having "0" as a second digit and searches for the largest combined decision value 846' in a fourth subset of the set of combined decision values 846" which have associated index symbols associated with the first transformer block having "1" as a second digit. The difference in the largest combined decision values 846' is output as soft decision data 860' for the second digit of the index symbol corresponding to the orthogonal code most likely sent and associated with the first transformer block. The soft decision data 860' for second digit of the index symbol represents a measure of confidence of the value of the second digit of the index symbol corresponding to the orthogonal code most likely sent. In other words, the soft decision data 860' for the second digit of the index symbol represents a measure of confidence of the value of the second digit of the respective interleaved data symbol 180 originally sent.

This process continues until the dual-maxima metric generator 950 soft decision data 860' for the last digit in the index symbol corresponding to the orthogonal code most likely sent and associated with the first transformer block.

After the dual-maxima metric generator 950 generates soft decision data 860' for the last digit in the index symbol for the first transformer block, then the dual-maxima metric generator 950 generates soft decision data 860' for each digit in the index symbol corresponding to the orthogonal code most likely sent and associated with the second transformer block in the same way. In other words, the dual-maxima metric generator 950 generates soft decision data 860' for each digit in the respective interleaved data symbol 180.

That is, the dual-maxima metric generator 950 first searches for the largest combined decision value 846' in a first subset of the combined decision values 846' which have associated index symbols associated with the second transformer block having "0" as the first digit. The dual-maxima metric generators 950 then searches for the largest combined decision value 846' in a second subset of the set of combined decision values 846' which have associated index symbols associated with the second transformer block having "1" as a first digit. The difference in the largest combined decision value 846' in the first subset with the largest combined decision value 846' in the second subset is output from the dual-maxima metric generator 950 as soft decision data 860' for the first digit of the index" symbol of the orthogonal code most likely sent and associated with the second transformer block.

Next, the dual-maxima metric generator 950 searches for the largest combined decision value 846' in a third subset of the set of combined decision values 846' which have associated index symbols associated with the second transformer block having "0" as a second digit and searches for the largest combined decision value 846' in a fourth subset of the set of combined decision values 846' which have associated index symbols associated with the second transformer block having "1" as a second digit. The difference in the largest combined decision values 846' is output as soft decision data 860' for the second digit of the index symbol corresponding to the orthogonal code most likely sent and associated with the second transformer block.

This process continues until the dual-maxima metric generator 950 soft decision data 860' for the last digit in the index symbol corresponding to the orthogonal code most likely sent and associated with the second transformer block.

Using the same method, the dual-maxima metric generator 950 generates soft decision data 860' for all the digits of the index symbol corresponding to the orthogonal code most likely sent and associated with the third transformer block.

The process above is repeated to produce more soft decision data 860' associated with the next set of transformer blocks, and so on. The next set of transformer blocks is the set of transformer blocks containing as the first transformer block, the transformer block immediately following the last transformer block used in the previous set of transformer blocks. (i.e. none of the sets of transformer blocks contain transformer blocks from another set).

The soft decision data 860' is carried from the dual-maxima metric generator 950 to the de-interleaver 550'''. The deinterleaver 550''' deinterleaves the soft decision data 860' and generates the interleaved soft decision data 870'. In particular, the soft decision data 860' is inputted into the matrix of the predetermined size in a row by row manner. The deinterleaved soft decision data 870' is outputted from the matrix of the predetermined size in a column by column manner. The deinterleaved soft decision data 870' is outputted by the deinterleaver 550''' at the same speed that the soft decision data 860' was inputted into a deinterleaver 550''' (e.g. 28.8 kmetrics/sec).

The interleaved soft decision data 870' is then carried from the deinterleaver 550''' to decoder 560''' which utilizes maximum likelihood decoding techniques to estimate digital traffic data bits 880'. Preferably, the decoder 560''' is a viterbi decoder.

Alternatively, the rake receiver design need not be used. A simple dual maxima block detection receiver simply uses one finger.

The method used by a simple dual maxima block detection receiver to generate the soft decision data associated with the $k^{th}$ transformer block, the k+1 transformer block and the k+2 transformer block may be represented mathematically fairly easily as follows:

$$\Delta_i = \max\{|r_{3k,m} + r_{3k+1,l} + r_{3k+2,n}|^2 m, l, n \in S_i\} - \max\{|r_{3k,m} + r_{3k+1,l} + r_{3k+2,n}|^2 m, l, n \in \overline{S}_i\}$$

where $1 \leq I \leq 18$;

where $S_i = \{$all m,l,n: $i^{th}$ corresponding bit is "0"$\}$ and $\overline{S}_i = \{$all m,l,n: $i^{th}$ corresponding bit is "1"$\}$.

$\Delta_i$, where $1 \leq I \leq 6$, is the soft decision data associated with the first transformer block; $\Delta_i$, where $7 \leq I \leq 12$, is the soft decision data associated with the second transformer block and $\Delta_i$, where $13 \leq I \leq 18$, is the soft decision data associated with the third transformer block.

Since the multiple block detection approach can be considered as the sequence estimation, the performance of a block detection receiver, such as either of the block detection receivers described in the first and second embodiments, is close to that of coherent detection and is much better than that of the conventional single maxima receiver and the conventional dual maxima receiver.

We claim:

1. In a receiver having a demodulator which provides groups of de-spread samples of a processed received signal, a method of detecting orthogonal codes carried in the processed received signal, said method comprising:
    (a) passing the groups of de-spread samples through an orthogonal code transformer to provide sequential transformer blocks, each transformer block comprising a plurality of transformer signals, each transformer signal corresponding to a respective one of the orthogonal codes;
    (b) buffering sequential pluralities of the sequential transformer blocks; and
    (c) carrying out a summing, squaring and selection operation over each sequential plurality of transformer blocks to obtain a desired orthogonal code from each of the transformer blocks of each sequential plurality of transformer blocks.

2. The method according to claim 1 wherein each orthogonal code is from a set of a fixed number of possible orthogonal codes and wherein each transformer block comprises a plurality of transformer signals, each transformer signal corresponding to one of said orthogonal codes in the set of possible orthogonal codes and wherein the summing, squaring and selection operation comprises:
    (a) summing together one transformer signal from each sequential transformer block in every possible combination generating a group of summed transformer signals;
    (b) squaring each summed transformer signal, generating a group of energy values;
    (c) selecting the largest energy value from the group of energy values;
    (d) selecting the orthogonal codes associated with the largest energy value.

3. A method according to claim 2 wherein each orthogonal code has an associated index symbol and wherein the method further comprises:
    (a) selecting the index symbols associated with the selected orthogonal codes,
    (e) scaling the index symbols generating soft decision data.

4. A method according to claim 3 further comprising the following steps:
    (a) deinterleaving the soft decision data; and
    (b) decoding the soft decision data into digital traffic data bits.

5. A method according to claim 4 wherein the orthogonal codes are Walsh codes.

6. A method according to claim 5 wherein the orthogonal code transformer is a fast Hadamard transformer.

7. The method according to claim 1 wherein each orthogonal code is from a set of a fixed number of possible orthogonal codes, each orthogonal code having an associated index symbol and wherein each transformer block comprises a plurality of transformer signals, each transformer signal corresponding to one of said orthogonal codes in the set of possible orthogonal codes and wherein the squaring, summing and selection operation comprises:
    (a) summing together one transformer signal from each sequential transformer block in every possible combination generating a group of summed transformer signals;
    (b) squaring each summed transformer signal, generating a group of energy values;
    (c) searching a first subset of said energy values for a maximum energy value wherein said first subset contains each of said energy values associated with an Index value associated with a preselected transformer block having "0" as a preselected digit;
    (d) searching a second subset of said energy values for a maximum energy value wherein said second subset contains each of said energy values associated with an index value associated with the preselected transformer block having "1" as the preselected digit; and,
    (e) generating a difference between said maximum energy value of said first subset and said maximum energy value in said second subset wherein said difference is soft decision data for the preselected digit associated with the preselected transformer block.

8. A method according to claim 7 further comprising the following steps:
    (a) deinterleaving the soft decision data; and
    (b) decoding the soft decision data into digital traffic data bits.

9. A method according to claim 7 wherein the orthogonal codes are Walsh codes.

10. A method according to claim 9 wherein the orthogonal code transformer is a fast Hadamard transformer.

11. An apparatus for decoding an orthogonally encoded data signal carrying a plurality of orthogonal codes wherein each orthogonal code is from a set containing a fixed number of possible orthogonal codes, said apparatus comprising:

(a) buffering means for buffering a sequential plurality of transformer blocks, each transformer block having a plurality of transformer signals, one transformer signal for each of the orthogonal codes in the set of possible orthogonal codes; and, (b) decoding means for determining a desired orthogonal code from each of the transformer blocks of the sequential plurality of transformer blocks, wherein the decoding means uses transformer signals from each of the transformer blocks in the" sequential plurality of transformer blocks to determine each of the desired orthogonal codes.

12. An apparatus according to claim 11 further comprising at least one orthogonal code transformer for generating the blocks of transformer signals from groups of samples of a processed received signal.

13. An apparatus according to claim 12 further comprising at least one receiver and demodulator for receiving and demodulating an orthogonally encoded data signal and providing groups of samples of a processed received signal.

14. An apparatus according to claim 11 wherein said decoding means comprises:

(a) summing and squaring circuitry for summing together one transformer signal from each transformer block of the sequential plurality of transformer blocks in every possible combination generating a group of summed transformer signals and for squaring each summed transformer signal generating a group of energy values; and, (b), selection means for selecting the largest energy value and for selecting the orthogonal codes associated with the largest energy value.

15. An apparatus according to claim 11 wherein each orthogonal code in the set of possible orthogonal codes has an associated index symbol and wherein the decoding means comprises a modified dual-maxima metric generator which operates as follows:

(a) summing together one transformer signal from each sequential transformer block in every possible combination generating a group of summed transformer signals;

(b) squaring each summed transformer signal, generating a group of energy values;

(c) searching a first subset of said energy values for a maximum energy value wherein said first subset contains each of said energy values associated with an index value associated with a preselected transformer block having "0" as a preselected digit;

(d) searching a second subset of said energy values for a maximum energy value wherein said second subset contains each of said energy values associated with an index value associated with the preselected transformer block having "1" as the preselected digit; and, (e) generating a difference between said maximum energy value of said first subset and said maximum energy value in said second subset wherein said difference is soft decision data for the preselected digit associated with the preselected transformer block.

16. A method of decoding an orthogonally encoded data signal carrying a plurality of orthogonal codes corresponding to a respective plurality of data symbols in an original data signal, each data symbol having a first fixed number of digits, wherein each orthogonal code is from a set containing a second fixed number of possible orthogonal codes each having a corresponding index symbol and wherein one of the index symbols corresponds to each data symbol, said method comprising the steps of:

(a) receiving a plurality of transformer blocks of transformer signals wherein each transformer block is associated with an orthogonal code carried In said orthogonally encoded data signal and wherein each transformer signal in each transformer block corresponds to a respective one of said orthogonal codes within said second fixed number of orthogonal codes;

(b) buffering a third fixed number of transformer blocks, greater than one, the transformer blocks associated with a respective third fixed number of orthogonal codes carried in the orthogonally encoded data signal;

(c) by using jointly transformer signals in each transformer block in the third fixed number of transformer blocks, generating sets of soft decision data, one set for each transformer block of transformer signals buffered wherein the soft decision data is a measure of confidence of the value of a particular digit of a particular data symbol in the original data signal.

17. A method according to claim 16 wherein said method first comprises transforming groups of samples of the orthogonally encoded data signal into the transformer blocks of transformer signals.

18. An apparatus for decoding an orthogonally encoded data signal carrying a plurality of orthogonal codes wherein each orthogonal code is from a set containing a fixed number of possible orthogonal codes, said apparatus comprising:

(a) a buffer for buffering a sequential plurality of transformer blocks, each transformer block having a plurality of transformer signals, one transformer signal for each of the orthogonal codes in the set of possible orthogonal codes; and, (b) a decoder for determining a desired orthogonal code from each of the transformer blocks of the sequential plurality of transformer blocks, wherein the decoder uses transformer signals from each of the transformer blocks in the sequential plurality of transformer blocks to determine each of the desired orthogonal codes.

19. An apparatus according to claim 18 further comprising at least one orthogonal code transformer for generating the blocks of transformer signals from groups of samples of a processed received signal.

20. An apparatus according to claim 19 further comprising at least one receiver and demodulator for receiving and demodulating an orthogonally encoded data signal and providing groups of samples of a processed received signal.

* * * * *